Patented May 24, 1932

1,859,543

UNITED STATES PATENT OFFICE

EDOUARD URBAIN, OF PARIS, FRANCE

PREPARATION OF CHLORIDS OF PHOSPHORUS

No Drawing. Application filed May 15, 1929, Serial No. 363,415, and in France May 31, 1928.

It is acknowledged that the preparation of ferrophosphorus from natural phosphates is easier and more economical than the preparation of phosphorus itself. The present invention has for its purpose to provide a method of preparation of chlorids of phosphorus from ferrophosphorus.

When ferrophosphorus is treated with a current of anhydrous chlorin, reaction of chlorin upon ferrophosphorus takes place immediately and gives some pentachlorid of phosphorus and some ferric chlorid; but the separation of these bodies cannot be effected by distillation on account of the existence of a molecular compound, $PCl_3.FeCl_3$, which passes over without decomposition. However, the separation of the phosphorus and the iron becomes possible, by taking into account a novel observation of great technical value relative to the action of the molecular compound obtained from a new quantity of ferrophosphorus.

This action, which is produced before a red heat, results in the formation of ferrous chlorid and of phosphorus trichlorid so that distillation separates them easily. The ferrous chlorid itself reacts in turn upon the pentachlorid of phosphorus with the formation of ferric chlorid and of phosphorus trichlorid. These reactions permit the quantitative separation of iron and phosphorus, the latter in the state of phosphorus trichlorid, so that it may eventually be transferred into pentachlorid by the action of chlorin.

To employ this process one may proceed either by promoting, at a suitable temperature, the reaction of a measured amount of chlorin on the formed pentachlorid upon the excess of ferrophosphorus so that the distillation of the trichlorid is also obtained, or proceed with the maximum chlorination, then adding subsequently the quantity of ferrophosphorus necessary for the reduction of the phosphorus pentachlorid.

In carrying out my improved process, ferrophosphorus is treated with a current of anhydrous chlorin to form $FeCl_3$ and the molecular compound $FeCl_3.PCl_5$ in accordance with known reactions. When the maximum chlorination point has been reached and the product is below red heat, fresh ferrophosphorus is added to the reaction mass. When this is done, and the mass is subjected to the further action of chlorin, there is formed phosphorus trichlorid mixed with ferrous chlorid and the two may be separated by distillation.

I claim:

1. The process of producing phosphorus chlorids which consists in treating ferrophosphorus with chlorine gas at a temperature at which ferrophosphorus reacts with the chlorine gas, adding an excess of ferrophosphorus at the height of the reaction to obtain a mixture of ferrouschloride and phosphorus trichloride, and distilling the phosphorus trichloride obtained.

2. The process of producing phosphorus chlorids which consists in treating ferrophosphorus with chlorine gas at a temperature at which ferrophosphorus reacts with the chlorine gas, adding an excess of ferrophosphorus at the height of the reaction to obtain a mixture of ferrous-chloride and phosphorus trichloride, distilling the phosphorus trichloride obtained, and further treating the phosphorus trichloride with chlorine to form phosphorus pentachloride.

In testimony whereof I affix my signature this 24th day of April 1929.

EDOUARD URBAIN.